United States Patent [19]

Fischer et al.

[11] Patent Number: 4,738,868

[45] Date of Patent: Apr. 19, 1988

[54] PROCESS AND DEVICE FOR THE PREPARATION OF FIBER COMPOSITE MATERIALS

[75] Inventors: Juergen Fischer; Artur Roeber, both of Ludwigshafen, Fed. Rep. of Germany

[73] Assignee: BASF Aktiengesellschaft, Ludwigshafen, Fed. Rep. of Germany

[21] Appl. No.: 886,395

[22] Filed: Jul. 17, 1986

[30] Foreign Application Priority Data

Jul. 24, 1985 [DE] Fed. Rep. of Germany ....... 3526414

[51] Int. Cl.⁴ .............................................. B05D 3/02
[52] U.S. Cl. .................................. 427/53.1; 427/54.1
[58] Field of Search .................. 427/54.1, 389.9, 53.1; 118/50.1

[56] References Cited

U.S. PATENT DOCUMENTS

| | | | |
|---|---|---|---|
| 3,076,723 | 2/1963 | Covington | 427/54.1 X |
| 3,409,460 | 11/1968 | Mitchell et al. | 427/55 |
| 3,837,985 | 9/1974 | Chase | 427/389.8 X |
| 4,416,925 | 11/1983 | Goll | 427/393.5 X |
| 4,444,806 | 4/1984 | Morgan et al. | 427/389.8 X |
| 4,479,984 | 10/1984 | Levy et al. | 427/54.1 |

Primary Examiner—Thurman K. Page
Attorney, Agent, or Firm—William G. Conger; Joseph D. Michaels

[57] ABSTRACT

A continuous process for the preparation of fiber composite materials by impregnating fiber reinforcing material with a solution of a thermoplastic or thermosetting plastic precursor, followed by evaporating the solvent used by means of exposure to light having a wave length corresponding to the absorption maximum of the solvent.

10 Claims, 1 Drawing Sheet

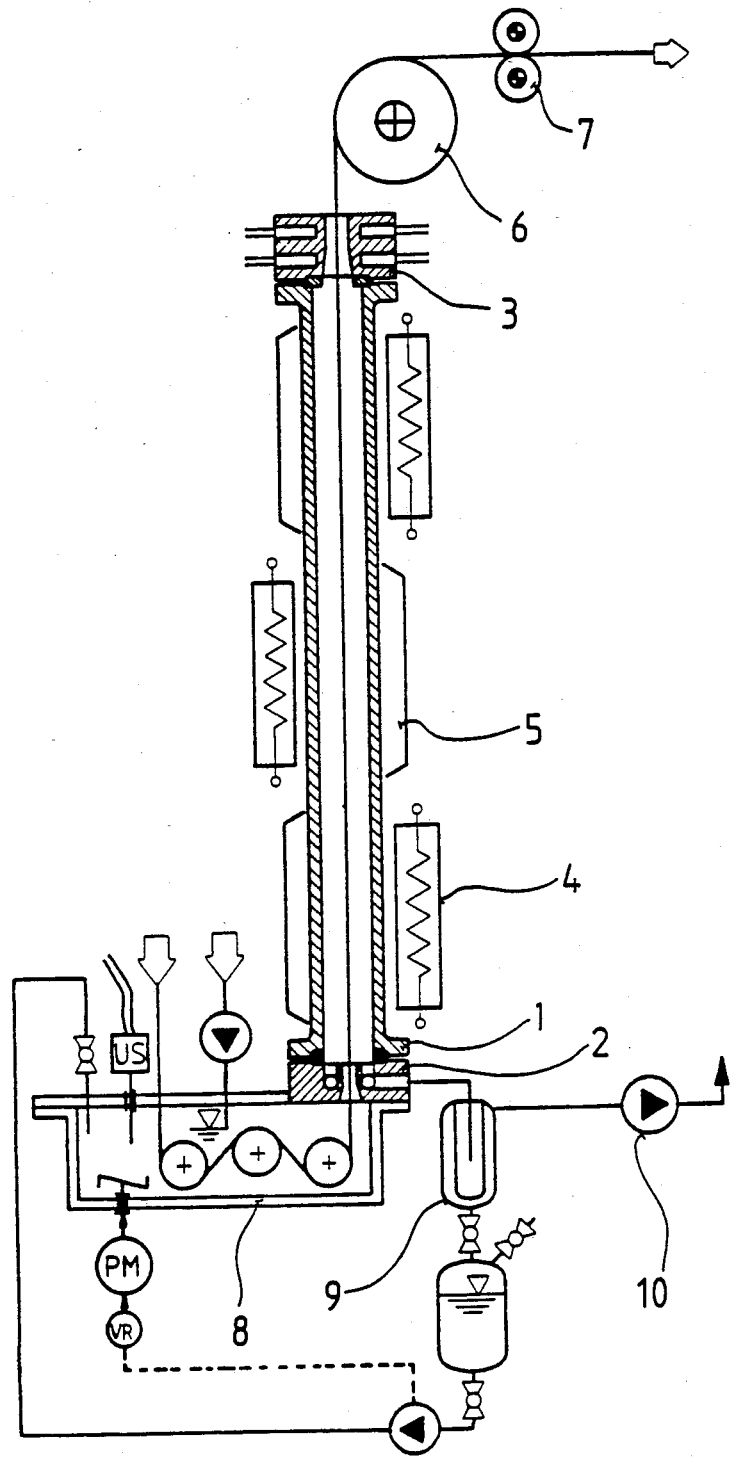

PROCESS AND DEVICE FOR THE PREPARATION OF FIBER COMPOSITE MATERIALS

BACKGROUND OF THE INVENTION

1. Field of the Invention

The subject invention deals with a process for the preparation of fiber composite materials through impregnation of the fibers with solvent-borne polymers followed by evaporation of the solvent, and for a device for the implementation of this process. Such prepregs containing reinforcing fibers and either or both thermoplastic and thermosetting plastic matrix resins are being used in increasing amounts as high performance structural materials.

2. Description of the Related Art

In the preparation of the fiber composite materials or prepregs as they are often called, one advantageously uses a solution of thermoplastic, or, in the case of the thermosetting plastics, a solution of polymer precursors, to impregnate the reinforcing fibers. By this technique, the polymer concentration and the impregnation bath temperature may be varied to achieve optimal viscosity, yielding high quality prepregs.

Removal of the solvent from the impregnated fiber material creates difficulties in this process. Previously, the evaporation of the solvent was carried out thermally. For example, the impregnated solvent-containing reinforcing fibers were led through a heating tower against a counter-current of hot air. In this process, large quantities of air must be circulated in order that the concentration of organic solvent in the escaping air is less than 0.1 percent. Under these conditions, the solvent can only be reclaimed at a very great expense. For practical reasons, the solvent was often burned.

It has been proposed to dry the impregnated reinforcing fibers through exposure to infra red (IR) light. Such irradiation primarily results in heating the air, which in turn causes evaporation of the solvent. In this instance a large and continuous flow of air is required. Furthermore, caution must be taken to ensure that the ratio of air to solvent lies sufficiently far above the explosion limit.

SUMMARY OF THE INVENTION

The object of the invention was the development of a process for the preparation of fiber composite materials, whereby the polymer impregnated reinforcing fibers could be dried in a simple and energy efficient manner, and whereby reclamation and recycle of the solvent would be economically feasible.

These and other objects of the invention were achieved through the evaporation of the solvent by means of exposure with light of a wave length which corresponds to the absorption maximum of the respective solvent. As a result, solvent incorporated into the prepreg is directly excited by exposure at the proper wave length, and rapidly difuses out of the prepreg due to the increase in kinetic energy.

BRIEF DESCRIPTION OF THE DRAWING

The drawing shows an impregnating bath containing a prepregging resin dissolved in a suitable solvent. Fibrous reinforcement is drawn through this bath into the the sintered of quartz drying tower where solvent removal is facilitated by means of external radiant energy sources and reflectors, producing a dried prepreg.

DESCRIPTION OF THE PREFERRED EMBODIMENT

As fiber reinforcing materials, rovings, parallel filaments and woven tapes and fabrics may be used. When vertical drying towers are used in the process of the subject invention, such fiber tapes and woven materials preferentially have widths of from about 0.3 to 10 mm. If wider prepregs are contemplated, then a horizontal drying apparatus should be used. The fibers are preferably glass, carbon/graphite (C/G) or aromatic polyamide (aramid).

The polymer matrix resin may be a thermoplastic or a thermosetting plastic. Preferred are amorphous thermophastics having a glass transition temperature greater than about 120° C., especially polyethersulfones, polysulfones, polyetherimides, polyether ketones, and polyarylether-thioethernitriles. The thermoplastic is applied as a solution in an organic solvent. Preferred are 10 to 50 weight percent solutions in solvents having boiling points less than about 80° C. Of special interest are dichloromethane and mixtures of dichloromethane and chloroform; which possess absorption maxima at 0.22 $\mu$m, 3.3. $\mu$m, 8.0 $\mu$m, and 13.0 $\mu$m.

Suitable thermosetting plastic precursors are epoxy resins, for example, those based on Bisphenol A or Novolak, unsaturated polyester resins, and vinylester resins. In the case of the unsaturated polyesters and vinylesters, if the crosslinking monomer is a solid such as diallylphthalate, solvents or viscosity reducing agents may be required. When using thermosetting plastic precursors, higher concentrations are possible, preferably in the range of from about 60 to 90 percent by weight. Recommended solvents are acetone (absorption maxima at 3.3 $\mu$m, 6.1 $\mu$m, and 7 to 8 $\mu$m), and methylethylketone (absorption maxima at 3.4 $\mu$m, 6.2 $\mu$m, and 7 to 8.5 $\mu$m). Solutions of thermosetting plastic precursors may contain suitable light sensitive stabilizers, which break down during exposure and which can effect a gelling of the resin.

The impregnation of the fiber reinforcing materials with the polymer solution is carried out in normal fashion. The reinforced fibers are carried through an impregnation bath, whereby the impregnation may be controlled by passage through guided rollers. The viscosity of the polymer solution can be varied over a wide range of from about 10 to 20,000 mPas, and preferably from about 200 to 5000 mPas. Using squeeze rollers or a doctor blade or the like, the resin content and hence the fiber content of the composite material can be optimally adjusted. Fiber contents from 40 to 70, preferably from 50 to 60 percent by weight are desired.

Following impregnation, the solvent-rich impregnated fibers travel through a drying path where the solvent is removed. In the process of the subject invention, evaporation occurs by exposure to a light having a wave length corresponding to the absorption maximum of the respective solvent.

The incident light should have a spectral distribution which overlaps the absorption maximum of the solvent. During the exposure the major portion of the incident radiant energy is picked up by the solvent, which evaporates as a result. Only a minor portion is lost as heat to the surroundings. Generally the evaporated solvent is removed by means of operation at reduced pressure, preferably at a pressure of from about 500 to 990 mbar. The required pressure is governed by the vapor pressure curve of the solvent and should be adjusted so that the concentration of the solvent in the gas phase has a value of about 1 percent of the saturation concentration in the composite fibers. The solvent thus removed is not as severely diluted with air as in conventional drying processes. It may be condensed by cooling and reused for the production of new solutions.

In many cases it may be advantageous to warm up the impregnated fiber reinforced materials to higher temperatures, generally in excess of 150° C., following the irradiative evaporation of the solvent to ensure thorough solvent removal. Where thermoplastics are used, the impregnated reinforced fibers may still contain solvent residues in quantities of up to 3 percent following the exposure process. These quantities can be completely removed through hot air or conventional IR exposure, preferably at 180° to 250° C. for a period of from 1 to 5 minutes.

In the case of the use of thermosetting plastic precursors, these residues are slightly crosslinked during such heating, and as a result converted into the so-called B stage. For thermosetting polymers final removal of solvent is usually conducted at temperatures between 150° and 180° C.

The dried, impregnated fiber materials can be worked in calendering rolls to generate a uniform upper surface layer. The prepregs thus prepared may be used to prepare structural composites by assembly into a semi-finished product, one of which panels are cut or spools are formed. The resulting semi-finished article can be processed by forming and hardening into finished articles, which can be used in the automotive and aerospace fields.

The subject invention further relates to an apparatus for the implementation of said process. This apparatus consists of an impregnation bath, through which the fiber reinforced material is drawn in order to impregnate it with the polymer solution, and drying tower connected to the impregnation bath in closed fashion. The drying tower consists of sintered quartz glass and possesses multiple irradiation sources on its external jacket surface. The light sources are selected to provide light whose spectrum corresponds closely to the absorption maximum of the solvent.

When the light source is combined with a suitably mounted reflector, the existing solvent in the impregnated fiber reinforced material diffuses especially quickly out of the fiber prepreg. Through the use of a vacuum pump in connection with the drying tower, it is possible to achieve a high concentration gradient of the solvent at the composite material/gas phase boundry. The vacuum to be used is primarily based on the vapor pressure curve of the solvent. Generally, a pressure is selected such that the concentration of the solvent in the gas phase is about 1/100 of its concentration in the prepreg.

The subject apparatus will be further clarified by example and in reference to the drawing. The apparatus consists of an impregnation bath (8) and a drying tower (1) frictionally connected to the impregnation bath. The reinforced material is drawn off of storage rolls over the so-called "dancing" roller system at constant tension and led into the impregnation bath. In the impregnation bath are auxiliary apparatuses, where needed, for example ultrasonic cells for the removal of the entrained air introduced along with the reinforcing material. A stirrer may also be required, as are traditional level control devices and the like. Such devices are well known to those skilled in the coating art.

The drying tower (1) consists of sintered quartz glass with a high clarity to light from the irradiation sources (4). The irradiation sources, located on the external jacket surface of the drying tower, may be visible or IR sources, so long as one or more of the emission peaks correponds substantially to one or more of the absorption maxima of the solvent. The emission spectrum of the light source may be adjusted through suitable filters or coatings, by choice of filament or gas filler, or by adjusting the lamp voltage supply.

The arrangement of the radiation sources is so chosen, that as the length of the drying tower increases, or the prepreg residence time increases, the tower temperature and irradiation intensity decreases. Reflectors are illustrated (5), wherein each irradiation source is located diametrically opposed to a reflector on the jacket surface of the desorption tube.

At the upper and lower ends of the drying tower (1) there are connecting devices (2) and (3). Connecting device (2) helps regulate the required quantity of polymer solution for the impregnation of the reinforcing materials. Excess polymer solution is drawn into the gas stream and separated therefrom by means of a cold trap (9) which also serves to condense the evaporated solvent. The separated solvent/polymer solution is periodically transferred to the holding tank immediately below and recycled from there to the impregnation bath. Prior to recycling, additional polymer may be added if necessary. The connector (2) communicates via a ring tunnel with a vaccum pump (10). Connector 3 contains cooling coils to lower the temperature of the prepreg prior to take up and calendering. Air removed by pump (10) also enters the apparatus predominately at this point.

The fiber prepregs are led to the top of the drying tower (1) by a guide roller (6) and following surface finishing by the calendering roller (7) are subsequently wound up. The guide roller and calender require a constant uptake of fiber prepreg material.

EXAMPLE

This example demonstrates removal of methylene chloride from fiber prepregs. Fiber prepregs made from glass fibers, type EC 14-P185-1200, emerge from the impregnation device with a velocity of 2.5 m/min, having a matrix resin solvent content of 49 percent before drying. Methylene chloride is present in the matrix resin solution at a concentration of 75 percent by weight. Complete solvent removal requires a solvent removal rate of 48.5 g/min.

With an output of 3 kg/h of fiber prepregs through the apparatus, a drying efficiency of 48.4 g/min or 99.8 percent is obtained. The drying tower is 2.3 m high and fitted with a total of 4 irradiation fields, which emit wave lengths having a spectral maximum at 3.3 $\mu$m. The total energy absorbed by the material is 520 W. During solvent removal the column is maintained at a constant pressure of 350 mbar.

The embodiments of the invention in which an exclusive privilege or property is claimed are defined as follows:

1. A continuous process for the preparation of matrix resin impregnated fiber prepregs, comprising impregnating fiber reinforcing material with a solution of a thermoplastic or a thermosetting plastic precursor dissolved in an organic solvent and evaporating and recovering the solvent, wherein the evaporation of the solvent is achieved by exposing said prepreg to visible or infrared light of a wave length which corresponds to the peak absorption frequency of the solvent.

2. The process of claim 1 wherein said reinforcing material comprises rovings, parallel filaments, or woven tape of glass, carbon/graphite, or aromatic polyamide.

3. The process of claim 1 wherein said matrix resin comprises a thermoplastic matrix resin having a glass transition temperature greater than 120° C.

4. The process of claim 3 wherein said solution comprises 10 to 50 percent by weight solution of a thermoplastic dissolved in an organic solvent having a boiling point less than about 80° C.

5. The process of claim 4 wherein said solvent comprises dichloromethane or a mixture of dichloromethane and chloroform.

6. The process of claim 1 wherein said thermosetting plastic precursor is selected from the group consisting of epoxy resins, unsaturated polyesters, or vinyl ester resins.

7. The process of claim 6 wherein said thermosetting plastic precursor comprises a 60 to 90 percent by weight solution of said precursor in an organic solvent having a boiling point less than 80° C.

8. The process of claim 1 wherein said solvent is removed under vacuum maintained between 300 and 990 mbar.

9. The process of claim 1 wherein the solvent is condensed and recycled.

10. The process of claim 1 wherein residual, unevaporated solvent is removed from said impregnated fiber reinforcing material by heating to a temperature of greater than 150° C.

* * * * *